US011931982B2

(12) United States Patent
Sablone et al.

(10) Patent No.: US 11,931,982 B2
(45) Date of Patent: Mar. 19, 2024

(54) METHOD AND APPARATUS FOR PRODUCING FACE PROTECTION MASKS

(71) Applicant: Fameccanica.Data S.p.A., San Giovanni Teatino (IT)

(72) Inventors: Gabriele Sablone, San Giovanni Teatino (IT); Antonio Giansante, San Giovanni Teatino (IT); Devin Cucchiella, San Giovanni Teatino (IT)

(73) Assignee: Fameccanica.Data S.p.A.

( * ) Notice: Subject to any disclaimer, the term of this patent is extended or adjusted under 35 U.S.C. 154(b) by 99 days.

(21) Appl. No.: 17/540,422

(22) Filed: Dec. 2, 2021

(65) Prior Publication Data

US 2022/0176665 A1     Jun. 9, 2022

(30) Foreign Application Priority Data

Dec. 3, 2020   (IT) .................. 102020000029588

(51) Int. Cl.
*B29D 99/00*   (2010.01)
*A41D 13/11*   (2006.01)
*B65H 35/08*   (2006.01)
*B32B 38/00*   (2006.01)

(52) U.S. Cl.
CPC ...... *B29D 99/0071* (2013.01); *A41D 13/1161* (2013.01); *B65H 35/08* (2013.01); *B32B 38/0004* (2013.01); *Y10T 156/1052* (2015.01); *Y10T 156/1057* (2015.01)

(58) Field of Classification Search
CPC ............ B29D 99/0071; A41D 13/1161; A41D 13/1115; B65H 35/08; B32B 38/0004; Y10T 156/1052; Y10T 156/1057
See application file for complete search history.

(56) References Cited

U.S. PATENT DOCUMENTS 4,941,470 A *   7/1990   Hubbard ............ A41D 13/1115
                                            128/206.13
9,629,401 B2 *  4/2017   Al Malki ........... A41D 13/1138

FOREIGN PATENT DOCUMENTS

| CN | 111109716 | * | 5/2020 | ......... A41D 13/1161 |
| FR | 2313085 A2 | | 12/1976 | |
| WO | 9628217 A1 | | 9/1996 | |
| WO | 2019035817 A1 | | 2/2019 | |
| WO | 2019199319 A1 | | 10/2019 | |

OTHER PUBLICATIONS

European Search Report dated Aug. 9, 2021. 9 pages.

* cited by examiner

*Primary Examiner* — George R Koch
*Assistant Examiner* — Christopher C Caillouet
(74) *Attorney, Agent, or Firm* — RMCK Law Group PLC

(57) ABSTRACT

A method and an apparatus for manufacturing, in a continuous flow, face protection masks including a mask body and two U-shaped elastic thread portions, which are formed by bending respective elastic thread portions retained by a group of sectors including a fixed sector and two movable sectors rotatable with respect to the fixed sector.

5 Claims, 5 Drawing Sheets

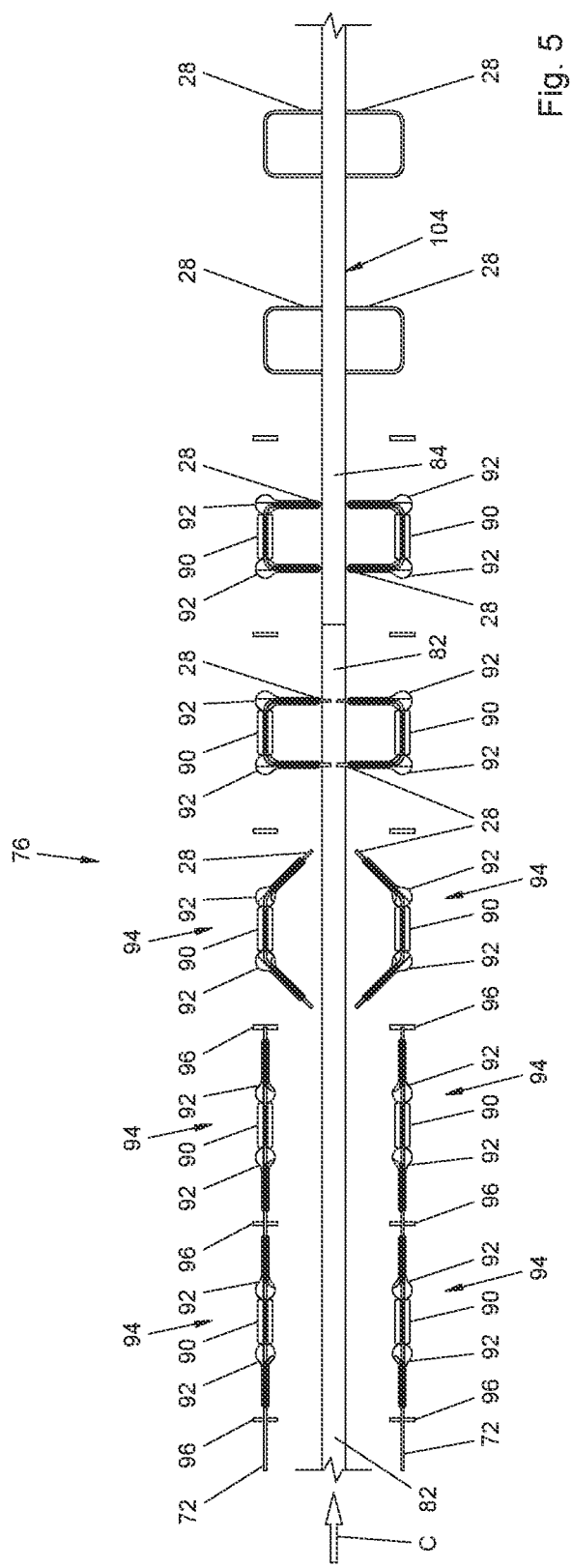

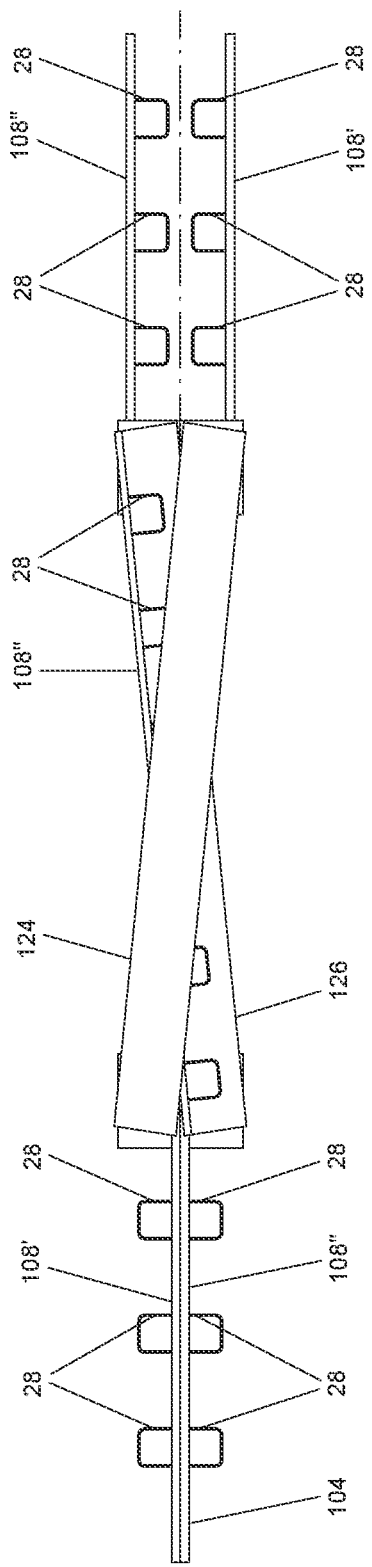

METHOD AND APPARATUS FOR PRODUCING FACE PROTECTION MASKS

CROSS-REFERENCE TO RELATED APPLICATION

This application claims priority to Italian Patent Application No. 102020000029588 filed Dec. 3, 2020. The disclosure of the above application is incorporated herein by reference in its entirety.

FIELD OF THE INVENTION

The present invention relates to a method and an apparatus for producing face protection masks.

More specifically, the invention relates to a method and an apparatus for producing face protection masks comprising a mask body and a pair of elastic ear loops attached to opposite sides of the mask body.

The invention may be employed both for the production of disposable surgical masks and for the production of FFP (Filtering Face Piece) filtering masks having a FFP1, FFP2 or FFP3 protection level, according to the standard DIN EN 149:2001+A1:2009.

DESCRIPTION OF THE RELATED ART

Disposable surgical masks and filtering masks typically comprise a mask body and two C-shaped elastic threads attached to opposite sides of the mask body, which thereby form two ear loops to be arranged around the ears of the user in order to keep the mask body in position against the user's mouth and nose.

Most known apparatuses for producing face protection masks of this type envisage stopping the mask bodies in order to apply the elastic ear loops. The ends of the elastic thread portions forming the ear loops are gripped by pliers and applied to the respective mask body. Then, the ends of the elastic thread portions are welded to respective portions of the mask body while the latter is kept stationary. Such apparatuses have a typical production speed of about 50-80 pieces/1'. In order to increase the production speed of such machines, the mask bodies are normally shunted towards two or more welding units, whereat the elastic ear loops are attached to the mask bodies.

In order to increase the speed of the apparatuses for producing face protection masks, solutions have already been proposed wherein the elastic threads which will form the ear loops are bent into a sinusoidal shape before being attached to the mask bodies. Such solutions enable increasing the production speed of the apparatus, but they suffer from problems related to an insufficient control of the tension and of the length of the elastic threads. Indeed, during the sinusoidal bending of the elastic threads, it is very difficult to ensure an accurate control of the thread tension. As elastic threads are extensible, a variation in tension involves a variation in length. Therefore, a problem of such known solutions consists in the possibility that the elastic thread portions forming the elastic ear loops may not have uniform lengths. A further problem in known apparatuses is that the bending of the elastic threads into a sinusoidal shape causes the ends of the elastic threads not be orthogonal but rather inclined with respect to the mask body side edges, at the expense of the ergonomic properties of the product and with a consequent greater length of the thread portions forming the welding areas.

OBJECT AND SUMMARY OF THE INVENTION

The present invention aims at providing a method and an apparatus for producing face protection masks which overcome the problems of the related art.

Specifically, the present invention aims at providing a method for producing face protection masks having a production speed higher than the known apparatuses.

A further object of the present invention is providing a method and an apparatus for producing face protection masks which enable obtaining a higher uniformity of the length of the elastic thread forming the ear loops.

According to the present invention, said objects are achieved through a method and an apparatus having the features set forth in Claims 1 and 6.

The Claims form an integral part of the teaching provided herein with reference to the invention.

According to the present invention, forming the ear loops is obtained by retaining successive portions of elastic threads through arrays of holding sectors being arranged in subsequent groups, wherein in each group a central sector is fixed and two lateral sectors are movable, in order to bend the respective portion of elastic thread into a U-shape.

Thanks to this inventive solution it is possible to bend the elastic threads into a U-shape at high speed and without ever losing the control on the thread tension. Therefore, the U-bending is performed while keeping control of the length of the elastic thread portions.

In possible embodiments, the U-bent ends of the elastic thread portions may be fixed to a continuous tape formed by at least one continuous web of non-woven fabric. The fixation between the ends of the elastic thread portions and the tape may be obtained via gluing, ultra-sonic welding, thermal welding or a mechanical anchoring of the threads between the welding spots. The tape which keeps the elastic thread portions bent in a U-shape may be fixed to the respective mask body via gluing, ultra-sonic welding or thermal welding.

In possible embodiments, the ends of the U-bent elastic thread portions may be attached directly to the respective mask bodies, without being previously fixed to a tape.

When the ends of the U-bent elastic threads are fixed to a tape, said tape may be continuous and may be cut in a longitudinal direction in order to form two parallel arrays of ear loops.

In possible embodiments, the tape which retains the U-bent elastic thread portions may be formed by discrete portions of non-woven fabric.

BRIEF DESCRIPTION OF THE DRAWINGS

The present invention will now be described in detail with reference to the annexed drawings, which are given by non-limiting example only, wherein:

FIG. 5 is a schematic plan view showing the process steps for forming the elastic ear loops, and FIG. 6 is a schematic plan view showing an embodiment of a component of the apparatus of FIG. 2.

It will be appreciated that the various Figures may not be drawn to the same scale. Moreover, it will be appreciated that in some Figures certain elements or components may not be shown, in order to better highlight other elements or components or in order to simplify the comprehension of the Figures.

DETAILED DESCRIPTION

Figure 1:
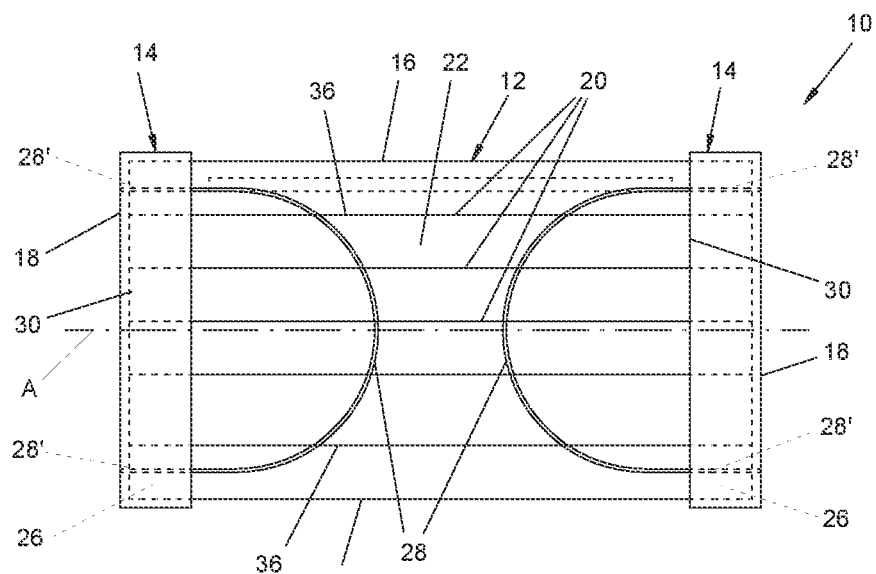
FIG. 1 is a perspective view of an embodiment of a face protection mask produced through a method and an apparatus according to the present invention.
Figure 2:
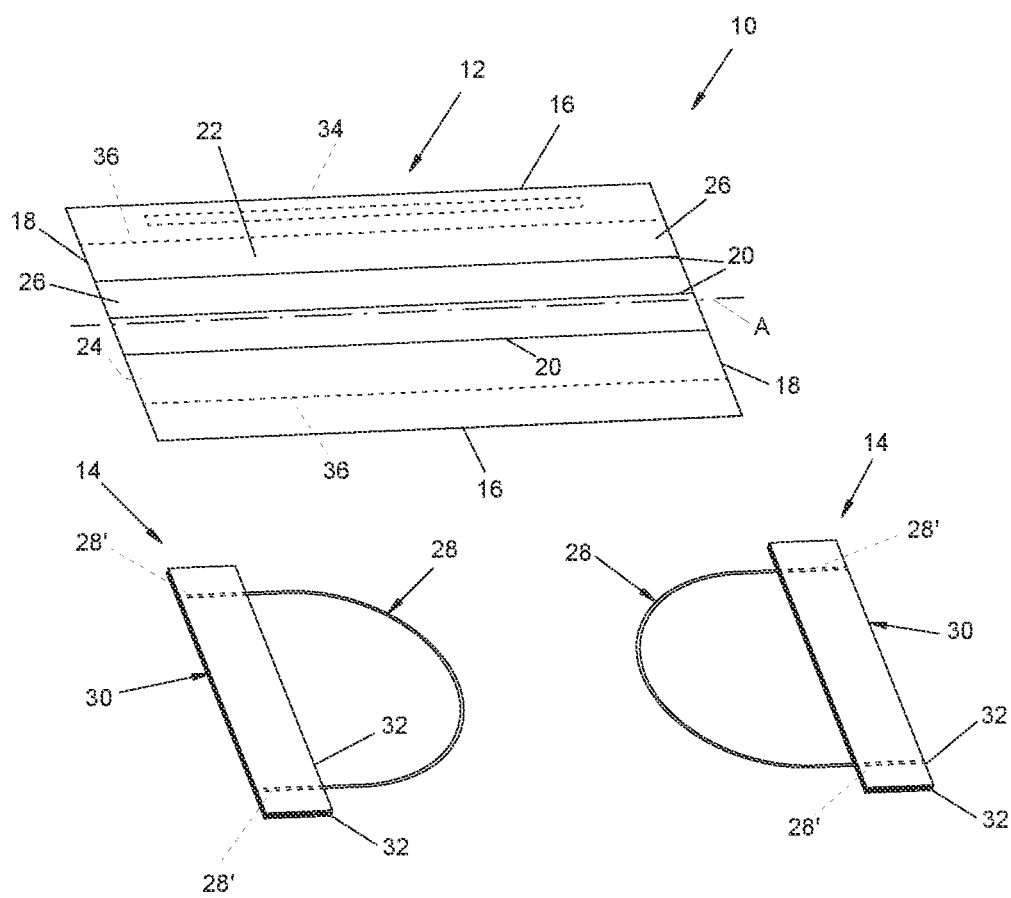
FIG. 2 is an exploded perspective view of the face protection mask of FIG. 1.

With reference to FIGS. 1 and 2, reference 10 denotes a face protection mask according to an embodiment of the present invention. Mask 10 comprises a mask body 12 and two ear loops 14.

The mask body 12 is made of a non-woven fabric and has a flat rectangular shape, with two longer sides 16 parallel to a longitudinal axis A and two shorter sides 18 orthogonal to longitudinal axis A. In a possible embodiment, the mask body 12 may be formed by three layers of non-woven fabric overlapping one another. For example, the inner layer may be a Thermal-Bond material, the intermediate layer a Melt-blown material and the outer layer a Spunbond material.

The mask body 12 has a series of pleats 20 which are parallel to the longitudinal axis A, and which extend throughout the length of the mask body 12. The mask body 12 has an outer face 22 and an inner face 24 parallel to each other. The mask body 12 has respective lateral portions adjacent to the respective shorter sides 18.

Each of both ear loops 14 includes an elastic thread portion 28 which is bent into a U-shape, and a portion of non-woven tape 30. The elastic thread portion 28 of each ear loop 14 may be made of Spandex. The elastic thread portion 28 has opposite ends 28' fixed to the tape portion 30. The ends 28' of the elastic thread portion 28 may be fixed to the tape portion 30 via gluing, ultra-sonic welding, thermal welding or a mechanical anchoring between two welding spots (as described in EP-B1-0886480 by Cera France). The tape portion 30 may be formed either by a single layer of non-woven fabric or by two layers of non-woven fabric, which are attached to each other and arranged at opposite sides of the ends 28' of the elastic thread portion 28. The layer(s) of non-woven fabric forming the tape portions 30 may be formed of a Thermal-Bond material.

The tape portions 30 of both ear loops 14 may be attached to the inner face 22 or to the outer face 24 of the mask body 12. The tape portions 30 overlap respective lateral portions 26 of the mask body 12, and are fixed frontally to the inner face 24 or to the outer face 22 via ultra-sonic welding, gluing or thermal welding. The elastic thread portions 28 may face inwardly of the mask body 12, as shown in FIG. 1, or else they may extend outwardly of the mask body 12, beyond the shorter sides 18.

The mask body 12 may include a nose clip 34, formed by a strip of plastically deformable material which is arranged parallel to one of the longer sides 16, with the purpose of shaping the upper edge of the mask body 12 around the user's nose. The nose clip 34 may for example be formed by a thin metal strip coated with plastic material, e.g. polyethylene. The nose clip 34 may be retained within a folded longitudinal edge 36 of the mask body 12. The folded longitudinal edge 36 may be fixed to the outer face 22 or to the inner face 24 via ultra-sonic welding, gluing or thermal welding. In a possible embodiment, both longitudinal edges 36 may be folded and fixed to the outer face or to the inner face 24 via ultra-sonic welding, gluing or thermal welding. In possible embodiments, the nose clip 34 may be arranged between the mutually overlapping non-woven layers which form the mask body 12.

Figure 3:
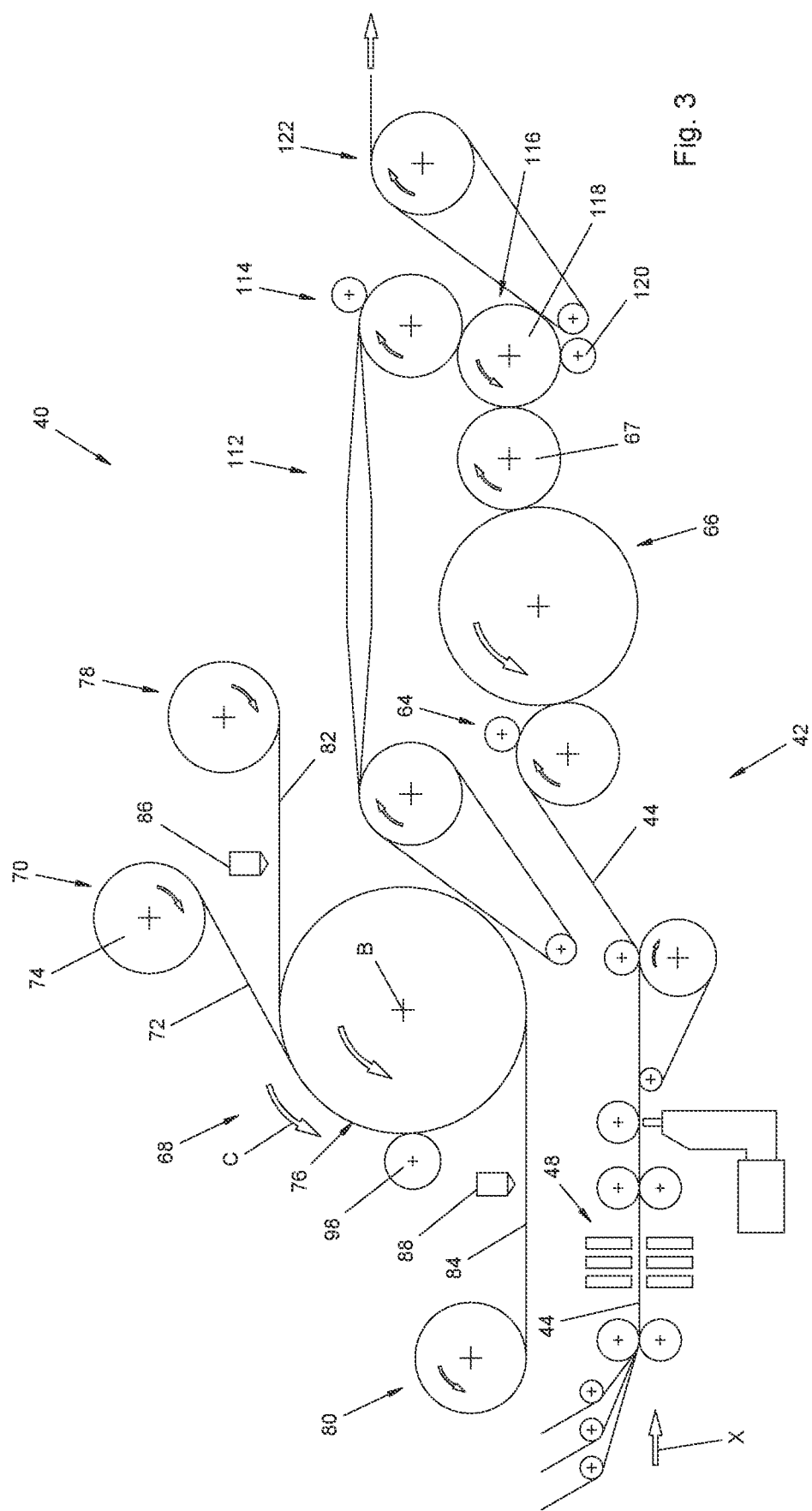
FIG. 3 is a schematic view of an apparatus for producing the face protection masks of FIGS. 1 and 2.

With reference to FIG. 3, an apparatus and a method for producing a face protection mask 10 of this type will be described.

In FIG. 2, reference 40 denotes a continuous flow apparatus for producing face protection masks 10. The phrase "continuous flow apparatus" denotes an apparatus wherein the blanks are continuously moved, without stops or interruptions, until the finished product is obtained.

Apparatus 40 comprises a mask body forming unit 42, wherein a continuous web of non-woven fabric 44 advances in the machine direction X. The forming unit 42 may be structured as described in detail in the Italian Patent Application number 10 2020 00000 8861 of the same Applicant (not yet published at the filing date of the present Application).

The mask body forming unit 42 comprises a folding device 48, configured to form, onto the continuous web of non-woven fabric 44, continuous pleats parallel to the machine direction X. The mask body forming unit 42 comprises a nose clip application device (not shown herein) which applies, to the continuous web of non-woven fabric 44, a sequence of nose clips, which are mutually spaced in the machine direction.

Apparatus 40 comprises a cutting unit 64, configured to cut the continuous web of non-woven fabric 44 in a direction transverse to the machine direction X, in order to form mask bodies having respective longitudinal axes parallel to the machine direction X.

Downstream cutting unit 64, the mask bodies are fed to a rotating device 66, which is configured to individually rotate the mask bodies by 90°. Directly downstream rotating device 66, the mask bodies have the longitudinal axes thereof arranged transversally with respect to the machine direction X. Directly downstream rotating device 66 the mask bodies 12, oriented with their respective longitudinal axes orthogonal to the machine direction X, are picked up by a transfer roller 67.

Apparatus 40 comprises an ear loop forming unit 68, configured to form in a continuous flow a first and a second array of ear loops.

The ear loop forming unit 68 comprises two unwinders 70 (only one of which is visible in FIG. 3) feeding two continuous elastic threads 72 parallel to each other from respective coils 74.

The ear loop forming unit 68 comprises a movable structure 76, to which the two continuous elastic threads 72 are fed. In the embodiment shown in the Figures, the movable structure includes a wheel 76 rotatable around an axis B orthogonal to the feeding direction of the continuous elastic threads 72. In possible embodiments, the movable structure 76 may consist in a belt or a table, which translate along a straight direction. In the following part of the description specific reference will be made to a movable structure including a wheel, but it is understood that the invention is not limited to this specific geometry.

Both continuous elastic threads 72 are feed onto the outer surface of wheel 76 along two circular arcs which are parallel to each other.

The ear loop forming unit 68 includes two unwinders 78, 80, configured to feed onto the outer surface of wheel 76 a first web of non-woven fabric 82 and a second web of non-woven fabric 84. Unwinders 78, 80 may be associated to respective glue dispensers 86, 88, which intermittently apply layers of glue onto the upper surfaces of the respective non-woven webs 82, 84.

In a possible embodiment one single unwinder, 78 or 80, may be provided, which feeds onto the outer surface of wheel 76 one single non-woven web 82 or 84.

Figure 4:
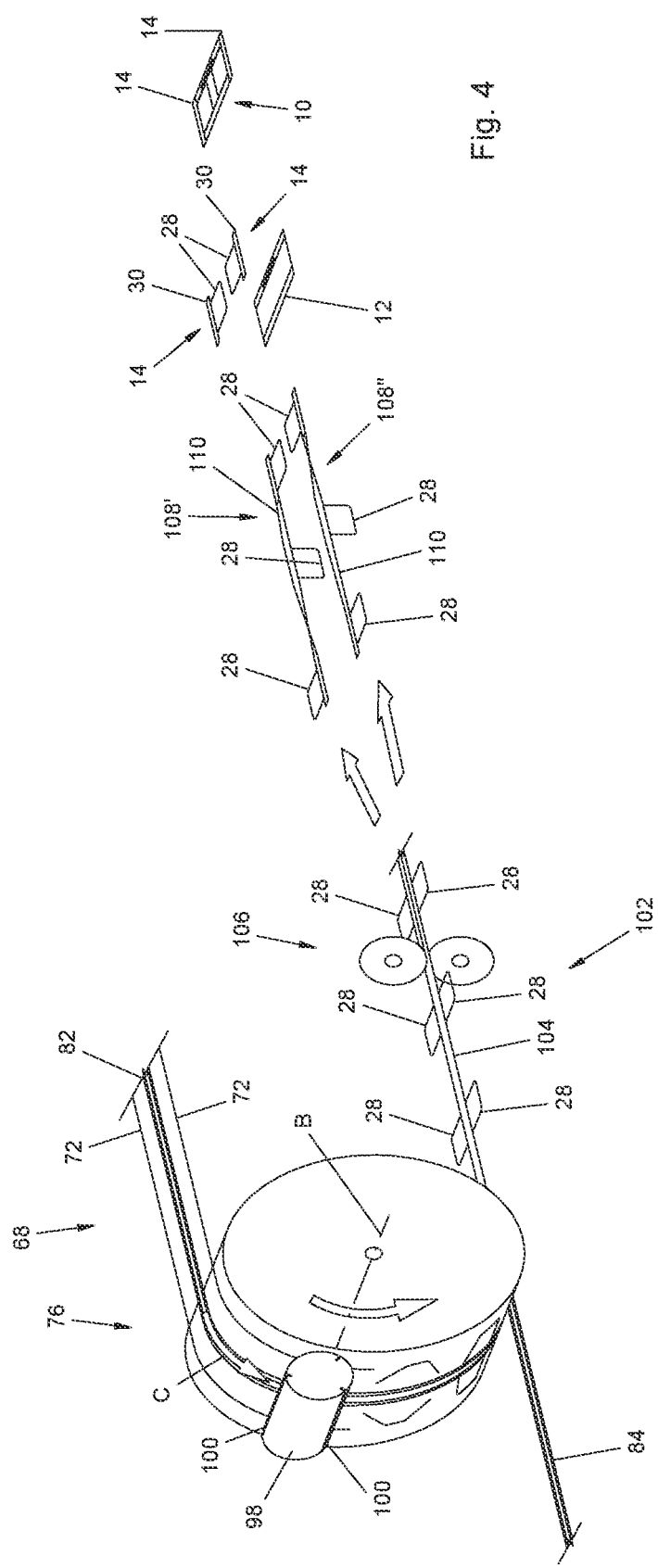
FIG. 4 is a schematic perspective view showing a part of the apparatus of FIG. 3.

FIG. 5 shows a flat representation of the external surface of wheel 76. Referring to FIGS. 4 and 5, the surface of wheel 76 is provided with two holding areas, each of which is configured to retain a portion of a respective elastic thread 72. The elastic threads 72 retained on the outer surface of wheel 76 move together with the wheel 76 in the direction shown by arrow C.

Each of both holding areas includes a plurality of fixed sectors 90 and a plurality of movable sectors 92. The fixed sectors 90 and the movable sectors 92 are provided with respective holding means, adapted to retain a respective elastic thread portion 72. The holding means of sectors 90, 92 may be formed by holes connected to a suction source.

The fixed sectors 90 are fixed with respect to wheel 76 and are parallel to the movement direction C. The movable sectors 92 are rotatable with respect to wheel 76 around respective radial axes. Each of the movable sectors 92 may move between a first position, wherein it is parallel to the movement direction C, and a second position wherein it is transverse with respect to the movement direction C. The movable sectors 92 may be controlled by a cam and, while wheel 76 is being rotated, they move cyclically from the first position to the second position, and vice-versa.

The fixed sectors 90 and the movable sectors 92 are arranged in successive groups of sectors 94. Each group of sectors 94 comprises a fixed sector 90 and two movable sectors 92. In each group of sectors 94, the two movable sectors 94 are arranged laterally on opposite sides of the respective fixed sector 90.

Wheel 76 includes a plurality of anvil elements 96, each of which is arranged between two groups of sectors 94 adjacent to each other.

With reference to FIG. 4, the ear loop forming unit 68 includes a cutting roller 98 having blades 100 cooperating with the anvil elements 96 of wheel 76, to cut the elastic threads 72 into successive portions while they are being retained on the outer surface of wheel 76 by the respective groups of sectors 94.

With reference to FIGS. 4 and 5, in operation both continuous elastic threads 72 are fed to an entry section of wheel 76, wherein the elastic threads 72 are aligned with respective arrays of holding sectors 90, 92. On the outer surface of wheel 76, the elastic threads 72 are retained by the respective fixed sectors 90 and movable sectors 92. Upstream cutting roller 98, the movable sectors 92 are aligned with the fixed sectors 90.

The elastic threads 72 are fed onto the outer surface of wheel 76 with a very small longitudinal extension. The longitudinal extension of the elastic threads 72 (i.e. the variation percentage of the length with respect to the length of the thread in an undeformed condition) may be lower than 30% and preferably comprised in a range between 10% and 30%.

The first non-woven web 82 is fed onto the outer surface of wheel 76 upstream cutting roller 98, and it is arranged on the outer surface of the wheel 76 between both elastic threads 72. On the upper surface of the first non-woven web 82 there are intermittently applied layers of glue which are mutually spaced in the longitudinal direction.

The cutting roller 98 cuts the elastic threads at regular intervals on the anvil elements 96, between each pair of groups of sectors 94, thereby forming a succession of elastic thread portions 28.

Downstream cutting roller 98, each elastic thread portion 28 is retained on wheel 76 by a fixed sector 90 and by two movable sectors 92. After cutting the elastic threads 72, the movable sectors 92 of each group of sectors 94 rotate by 90° towards each other, and U-bend the respective elastic thread portion 28 as shown in FIG. 5. During U-bending, the elastic thread portions 28 are retained by the respective sectors 90, 92, and this ensures a uniform length of the various elastic thread portions 28.

After U-bending the elastic thread portions 28, the ends 28' of the elastic thread portions 28 are placed on the first non-woven web 82 at the positions of the layers of glue which have previously been applied on the first non-woven web 82, in a precise phase relationship with respect to the wheel 76.

Referring to FIGS. 4 and 5, after U-bending the elastic thread portions 28, the second non-woven web 84 is applied onto the surface of wheel 76 in a position overlapping the first non-woven web 82. Also on the second non-woven web 84 it is possible to apply intermittent layers of glue in phase relationship with wheel 76, so that the layers of glue of the second non-woven web 84, in the same way as the layers of glue of the first non-woven web 82, are aligned with the respective ends 28' of the elastic thread portions 28.

With reference to FIGS. 4 and 5, at the exit of wheel 76, a continuous composite chain 102 is obtained which comprises an array of pairs of U-bent elastic thread portions 28. The pairs of elastic thread portions 28 are mutually spaced in a longitudinal direction, and are joined together by a continuous tape 104 fixed to the ends 28' of the elastic thread portions 28.

The continuous composite chain 102 is detached from wheel 76 in a detachment area. After releasing the elastic thread portions 28 in the detachment area, the movable sectors 92 move again into a position aligned with the fixed sectors 90, in order to pick up further elastic thread portions in the entry section of wheel 76.

The ends 28' of the elastic thread portions 28 may be fixed to the continuous tape by gluing, as in the presently described embodiment. In possible embodiments, the ends 28' of the elastic thread portions 28 may be fixed to tape 104 by ultra-sonic welding or thermal welding. In this latter case, the glue dispensers 86, 88 are omitted, whereas a welding unit is provided which performs welding between the ends 28' of the elastic thread portions 28 and the non-woven layers 82, 84. In possible embodiments, the ends 28' of the elastic thread portions 28 may be fixed to the non-woven layers 82, 84 via mechanical anchoring spots, i.e. welding spots between the non-woven layers 82, 84, which are located on opposite sides of the ends 28' of the elastic thread portions 28, and which are spaced by a distance shorter than the diameter of the elastic threads 28 in an undeformed condition, as described in EP-B1-0886480 by Cera France.

The continuous tape 104 may include two non-woven webs 82, 84 overlapping each other, as in the embodiment shown in FIGS. 4 and 5. In a possible embodiment, the continuous tape 104 may consist in a single web of non-woven fabric. The continuous tape 104 may be provided with printings arranged in phase relationship with the elastic thread portions 28.

In possible embodiments, instead of feeding continuous non-woven webs 82, 84, the apparatus may include cutting devices, configured to feed successions of discrete non-woven fabric portions mutually spaced in the longitudinal direction, and arranged at the ends 28' of the U-bent elastic thread portions 28.

With reference to FIG. 4, downstream wheel 76 there is provided a longitudinal cutting unit, which longitudinally cuts the continuous tape 104. Directly downstream the longitudinal cutting unit 106 there are obtained a first and a second continuous array 108', 108". Each continuous array 108', 108" includes a succession of ear loops 14, each comprising a U-shaped elastic thread portion 28 and a tape portion 30 fixed to the opposite ends 28' of the U-shaped elastic thread portion 28. In each continuous array 108', 108", the tape portions 30 of mutually adjacent ear loops 14 are joined together by scrap tape portions 110.

The first and the second continuous arrays 108', 108" are mutually spaced in a transverse direction, so that the distance between the ear loops 14 of each pair corresponds to the distance at which the pairs of ear loops 14 must be applied to the respective mask bodies 12.

When longitudinal cutting is performed, the U-shaped elastic thread portions 28 are mutually aligned and facing outwardly of tape 104. This arrangement is suitable for the case in which the ear loops 14 are applied to the mask bodies 12 with the elastic threads 28 extending outwardly of the respective mask bodies 12.

If it is desired to produce face masks 10 wherein the elastic threads 28 of the ear loops 14 are arranged within the mask bodies 12, as in the embodiment of FIG. 1, downstream the longitudinal cutting unit 106 both continuous arrays 108', 108" may be rotated by 180° around the respective longitudinal axes, in a rotating device denoted as 112 in FIG. 3. Directly downstream rotating device 112, the elastic threads 28 are located within the two mutually parallel tapes.

With reference to FIG. 6, in order to produce masks 10 wherein the elastic threads 28 of the ear loops 14 are arranged within the mask bodies 12, downstream the longitudinal cutting unit 106 both continuous arrays 108', 108" may be picked up by respective conveyor belts 124, 126 which cross each other and invert the relative position of the two continuous arrays 108', 108". The conveyor belts 124, 126 may retain both continuous arrays 108', 108" by suction. When they leave the conveyor belts 124, 126, the elastic threads 28 are arranged within the two mutually parallel tapes. This embodiment is advantageous because it enables a better control of both continuous arrays 108', 108", because both continuous arrays 108', 108" are never detached and are not subjected to rotations as is the case in the previously described embodiment.

Referring to FIG. 3, apparatus 40 includes a cutting unit 114 configured to perform cutting of the tapes of both continuous arrays 108', 108". As shown in FIG. 4, after this cutting individual ear loops 14 are obtained which respectively comprise a U-shaped elastic thread portion 28 and a tape portion 30 which is fixed to the opposite ends 28' of the U-shaped elastic thread portion 28. In the cutting step the tape portions 30 may be shaped in various ways.

The individual ear loops 14 are arranged pairwise, the ear loops 14 of each pair being mutually aligned and spaced in a transverse direction (FIG. 4). The ear loops 14 of each pair are mutually spaced in a transverse direction by a distance corresponding to the distance at which they will be applied to respective mask bodies 12.

In the cutting unit 114, the scrap tape portions 110 positioned between the ear loops 14 of each continuous array 108', 108" are detached from the ear loops 14 and disposed of as scrap, e.g. via a suction pipe.

With reference to FIG. 3, apparatus 40 comprises an application unit 116, wherein the ear loops 14 are applied and attached to respective mask bodies 12.

The application unit 116 comprises an anvil roller 118 cooperating with a welding device 120, e.g. an ultra-sonic welding device. The anvil roller 118 receives, from the transfer roller 67, the mask bodies 12 oriented transversally with respect to the machine direction. The anvil roller 118 moreover receives an array of ear loops 14 coming from the cutting unit 114. On the anvil roller 118, the pairs of ear loops 14 are in-phase with the respective mask bodies 12. The transfer roller 67 may be replaced by a repitch device, if the mask bodies 12 on the rotating device 66 have a different pitch with respect to the pitch between the successive ear loop pairs 14.

The welding device 120 cooperates with the anvil roller 118 in order to weld the tapes 30 of the ear loops 14 to the respective mask bodies 12. In possible embodiments, the attachment of the tapes 30 of the ear loops 14 to the respective mask bodies 12 may be obtained by gluing or thermal welding.

Downstream welding device 120 a continuous array of finished face masks 10 are obtained, which are transferred by the anvil roller 118 to an output conveyor 122. Directly downstream welding device 120 there may be provided an inspection system, in order to visually inspect the finished face masks and check the correct configuration thereof, especially as regards the position and the presence of the elastic ear loops. This optical inspection may be performed with backlighting, in order to obtain a correct contrast.

In a possible embodiment, the scrap tape portions 110 may be cut and removed after fixing the ear loops to the respective mask bodies 12. In this case, the cutting unit 114 is arranged downstream welding device 120.

In a possible embodiment, the U-bent elastic thread portions 28 may be attached directly to the mask bodies 12, without being previously fixed to a tape. In this case, apparatus 10 does not include the unwinders 78, 80 for feeding the first and the second non-woven web 82, 84, and wheel 76 directly transfers the U-bent elastic thread portions 28 to the anvil roller 118.

As stated in the foregoing, the ear loops 14 are fixed to the respective mask bodies 12 with the U-shaped elastic threads 28 extending inwardly with respect to the mask bodies 12. In a possible embodiment, the face masks 10 may be produced with the elastic threads 28 of the ear loops 14 oriented outwardly of the respective mask body 12.

The description in the foregoing refers to the production of surgical face masks wherein the mask body 12 consists in a rectangular panel provided with longitudinal pleats.

In a possible embodiment, the method and the apparatus according to the present invention may be used for producing FFP filtering masks. In this case, the ear loop forming unit 68 is the same as previously described, whereas the mask body forming unit 42 is replaced with a unit configured to produce mask bodies of the FFP type. Generally speaking, the ear loops 14 produced by the ear loop forming unit 68 may be attached to various different mask bodies, produced by any conventional apparatus.

The apparatus according to the present invention enables performing a continuous cycle process, with a production speed of about 600-1000 masks/1', while keeping an accurate control of the length of the elastic threads forming the ear loops.

The method and the apparatus according to the present invention enable the production of finished face masks without any direct human contact with the products. It is therefore possible to obtain a sterile packaging of the face masks, and to ensure the absence of contaminations.

Of course, without prejudice to the principle of the invention, the implementation details and the embodiments may vary appreciably from what has been described and illustrated herein, without departing from the scope of the invention as defined by the Claims that follow.

The invention claimed is:

1. A method for manufacturing face protection masks, comprising:
   forming an array of mask bodies advancing in a machine direction,
   forming a first and a second array of ear loops, wherein each ear loop includes a respective portion of U-bent elastic thread,
   attaching successive pairs of ear loops to respective mask bodies,
   wherein said step of forming a first and a second array of ear loops, comprises:
      feeding two continuous elastic threads, each in a longitudinal direction,
      retaining terminal portions of each of said two continuous elastic threads by respective arrays of holding sectors carried by a mobile structure, wherein said holding sectors are arranged in groups of sectors which hold respective elastic thread portions of said two continuous elastic threads, and wherein each of said groups of sectors comprises a fixed sector and two movable sectors arranged laterally on opposite sides of the fixed sector,
      cutting successive elastic thread portions between each pair of groups of sectors adjacent to each other so that each group of sectors holds a respective discrete elastic thread portion,
      bending each of said discrete elastic thread portions into a U-shape by rotating said movable sectors of each of said groups of sectors with respect to the respective fixed sector, so as to form a succession of discrete U-bent elastic thread portions.

2. The method according to claim 1, comprising fixing opposite ends of said discrete U-bent elastic thread portions to a continuous tape formed by at least one continuous non-woven web.

3. The method according to claim 2, comprising cutting in the longitudinal direction said continuous tape to form a first and a second continuous array, wherein each continuous array comprises a succession of ear loops, each of which includes said discrete U-shaped elastic thread portion and a tape section, and wherein in each continuous array the tape sections of the ear loops adjacent to each other are joined together by pieces of scrap tape.

4. The method according to claim 1, comprising directly fixing opposite ends of said discrete U-bent elastic thread portions to respective mask bodies.

5. The method according to claim 1, comprising fixing opposite ends of said discrete U-bent elastic thread portions to discrete lengths of tape.

* * * * *

UNITED STATES PATENT AND TRADEMARK OFFICE
CERTIFICATE OF CORRECTION

| | |
|---|---|
| PATENT NO. | : 11,931,982 B2 |
| APPLICATION NO. | : 17/540422 |
| DATED | : March 19, 2024 |
| INVENTOR(S) | : Sablone et al. |

It is certified that error appears in the above-identified patent and that said Letters Patent is hereby corrected as shown below:

On the Title Page

(71) Applicant address information should be listed as:
- Fameccanica.Data S.p.A., San Giovanni Teatino (Chieti), ITALY -

(72) Inventor address information should be listed as:
- Gabriele SABLONE, San Giovanni Teatino (Chieti), ITALY
Antonio GIANSANTE, San Giovanni Teatino (Chieti), ITALY
Devin CUCCHIELLA, San Giovanni Teatino (Chieti), ITALY -

Signed and Sealed this
Twenty-second Day of April, 2025

Coke Morgan Stewart
*Acting Director of the United States Patent and Trademark Office*